United States Patent [19]

Hercamp et al.

[11] Patent Number: 4,717,495

[45] Date of Patent: Jan. 5, 1988

[54] DIESEL ENGINE COOLING SYSTEM COMPOSITIONS

[75] Inventors: Richard D. Hercamp, Columbus, Ind.; Roy D. Hudgens, Cookeville, Tenn.

[73] Assignee: Fleetguard, Inc., Columbus, Ind.

[21] Appl. No.: 835,010

[22] Filed: Feb. 28, 1986

Related U.S. Application Data

[63] Continuation-in-part of Ser. No. 676,554, Nov. 30, 1984, abandoned.

[51] Int. Cl.$^4$ ................................................ C09K 5/00
[52] U.S. Cl. ......................................... 252/75; 252/74; 252/76; 252/78.3; 252/78.5; 252/79; 252/82; 252/387; 252/388; 252/389.2; 252/389.31; 252/389.4; 252/389.62; 252/396
[58] Field of Search ............... 252/74, 75, 76, 78.3, 252/78.5, 79, 82, 357, 388, 389.2, 381.31, 389.4, 389.62, 396

[56] References Cited

U.S. PATENT DOCUMENTS

| | | | |
|---|---|---|---|
| 2,815,328 | 12/1957 | Green et al. | 252/75 |
| 2,923,686 | 2/1960 | Ohlmann | 252/74 |
| 3,282,846 | 11/1966 | Scott | 252/75 |
| 3,666,404 | 5/1972 | Hwa et al. | 252/75 |
| 3,920,572 | 11/1975 | King et al. | 252/75 |
| 3,931,029 | 1/1976 | Dutton et al. | 252/76 |
| 3,962,109 | 6/1976 | Oberhofer et al. | 252/387 |
| 4,210,549 | 7/1980 | Hirozawa et al. | 252/75 |
| 4,382,008 | 5/1983 | Boreland et al. | 252/76 |
| 4,426,309 | 1/1984 | Abel et al. | 252/75 |
| 4,455,248 | 6/1984 | Wood | 252/75 |

FOREIGN PATENT DOCUMENTS 960937  1/1975  Canada .

OTHER PUBLICATIONS

Okun et al., "Use of Phosphatides in Inhibiting Additives for DVS Cooling Fluids", Energomashinostroenie 1978, (1), 25-6. (CA 89: 27225).

Shchukin et al., "Study of the Properties of Anticorrosion Additives to the Coolant Water of Diesels", Sudov Energ. Ustanovki, (Moskua), 79(19), pp. 42-50, (CA 93: 12883).

Cummins Engine Co., Inc., "Coolant Additives and Filtration", training brochure, 1983.

*Primary Examiner*—Robert Wax
*Attorney, Agent, or Firm*—Neuman, Williams, Anderson & Olson

[57] ABSTRACT

A heavy duty supplemental cooling composition for use in diesel engines which comprises a sodium-free buffer, a cavitation liner pitting inhibitor, a metal corrosion and hot surface corrosion inhibitor, a defoamer, a hot surface deposition and scale inhibitor and a detergent. An internal leakage trace element is included to detect leakage into the engine's lubricating oil.

10 Claims, No Drawings

DIESEL ENGINE COOLING SYSTEM COMPOSITIONS

This application is a continuation-in-part of copending application Ser. No. 676,554 filed Nov. 30, 1984, now abandoned.

This invention relates to supplemental coolant additives, particularly for diesel engine coolants.

Heavy duty diesel engines impose unique and stringent requirements on the cooling system. The expected life to overhaul for a heavy duty diesel engine is generally 4 to 5 times that of an automobile engine, despite the fact that the load factor is usually over twice as much and the gross vehicle weight per horsepower is usually 5 to 8 times as high. For a diesel to perform in this manner, good cooling system maintenance is necessary.

The heavy load factor for a heavy duty diesel engine means that cooling system efficiency is very important. Waste heat must flow freely through cylinder liners, head, oil cooler, aftercooler and radiator. If this process of heat transfer is interrupted, wear rates go up and engine efficiency goes down. For instance, the scaling or fouling of cylinder liners can result in greatly increased ring wear and substantially reduce the engine operating life between overhauls. Complicating this is the fact that diesel engine coolants often contain a higher level of contaminants, such as dirt, precipitated additives and oil.

A heavy duty diesel engine is often built with replaceable or wet cylinder liners. This feature makes the engine more easily rebuildable but also makes cooling system maintenance critical. Because of liner vibration due to piston slap, small holes or pits can develop and perforate the liner in only 30,000 miles of operation if only tap water is used in the cooling system. On the other hand, if an adequate amount of a properly formulated supplemental coolant additive is periodically added to the coolant, the liners can last 500,000 miles or more with little or no pitting damage. For this reason, heavy duty supplemental coolant additives must not compromise in this area of performance. Also, diesel cooling systems may employ cast iron or steel water pump impellers, which are susceptible to cavitation corrosion.

Because of the unique demands placed on cooling systems for heavy duty diesel engines, supplemental coolant additives have assumed an important role for the long term protection of their cooling systems. At the present time, substantially all of the heavy duty diesel engine manufacturers in the United States recommend the use of some type of supplemental coolant additive (SCA).

Historically, antifreeze compositions have been formulated to meet the coolant needs of automobiles but have not satisfactorily met the needs of a diesel engine. Accordingly, supplemental coolant additives are added to the diesel engine cooling system initially to make up for the deficiencies of the antifreeze solutions customarily used. Supplemental coolant additives are also added to the cooling system at each oil change to replace additives lost due to dilution and additive depletion.

So-called heavy duty antifreeze can be formulated to provide short-term liner pitting protection, but it will not provide long term protection under the conditions of heavy duty diesel engine use. It has been stated that conventional antifreezes have a service life of approximately 15,000 miles. For automotive service, this mileage may take about one year to accumulate, but in some line haul diesel engine truck fleet operations, 15,000 miles is accumulated in one month. To maintain an adequate level of additive in the system, the heavy duty antifreeze could be changed on a monthly basis, but this is costly. It is much more cost effective to use a supplemental coolant additive and not replace the antifreeze until 180,000 miles.

Low temperature performance is also important for a heavy duty diesel engine. Coolant temperatures can drop to 80° F. if a diesel is idled or involved in stop and go service at low loads in cold weather. The supplemental coolant additives should not foam excessively at higher temperatures of say 190° F. or at ambient temperatures. Under field conditions, the defoamer used in a supplemental coolant additive must be thermally stable and excessive amounts cannot be lost to metal surfaces if it is to perform adequately.

A supplemental coolant additive should prevent scaling of heat transfer surfaces. Scaling is usually used to refer to inorganic deposits that are composed of minerals from make-up water, precipitated corrosion inhibitors and corrosion products. Filtration, ion-exchange resin, water soluble polymers, or chelating agents have been used to deal with the scaling problem. The more effective approach is to use a combination of the above.

Fouling on the other hand, is generally used to denote deposits of an organic or biological nature. Fouling in a heavy duty cooling system usually involves lubricating oil contamination but rarely biological growth. Lubricating oil fouling is quite common in heavy duty systems. One random survey of over 200 trucks showed over 20 percent with various amounts of lube oil in the cooling system. A properly designed supplemental cooling additive must have a degree of detergency to prevent oil and other organic contaminants from fouling heat transfer surfaces and causing corrosion.

Compatibility problems can arise because a component of the antifreeze solution chemically reacts with a component of the supplemental coolant additive. Thus, for example, when chromate based supplemental coolant additives were added to antifreeze which contained arsenite, the two additives reacted immediately—neutralizing each other and forming large amounts of chromic hydroxide precipitant. The end result was a plugged cooling system and corrosion problems.

Compatibility problems can also occur because the limit of solubility of a component has been exceeded. For example, if a silicate containing supplemental coolant additive is added to an antifreeze which contains large amounts of silicate, the solubility of silicate in the solution may be exceeded and silicate gelation takes place. The cooling system can tolerate a moderate amount of gelation but heavy gelation will plug the cooling system filter and then plug cab heater cores and radiators.

Another antifreeze compatibility problem is the formation of disodium phosphate ($Na_2HPO_4$) crystals at low temperature. Since commercial antifreezes contain varying amounts of sodium and phosphate, the sodium or phosphate levels in the supplemental coolant additive must be low enough to keep the levels in the coolant mixture within the solubility limit.

In a typical on-highway heavy duty diesel engine cooling system, flow rate can range from 80 to 150 gallons per minute. This means that flow velocities can reach 8 to 10 feet per second. Tests have shown that solder and aluminum are sensitive to the effects of high flow rate.

During the time period of 1970-1985, borate-nitrite supplemental coolant additives have been the predominant type used in the United States and many other areas of the world. This type of additive is usually formulated with relatively high levels of nitrite and silicate. Nitrite, typically used to prevent liner pitting, is somewhat aggressive toward solder. If the nitrite level is reduced by replacing all or part of it with a different ingredient which is not aggressive toward lead yet still provides liner pitting protection, lead corrosion can be reduced.

Some water used in the cooling system can be very hard or corrosive. Conventional supplemental coolant additives and antifreezes have not provided good aluminum protection in all cases. Silicate levels have been increased by many antifreeze suppliers to resolve the problem in cars. However, when these high silicate antifreezes are used with conventional supplemental coolant additives, silicate gelation can occur. Aluminum protection can be provided without resorting to increased silicate levels by using other ingredients to provide protection even with the silicate level being reduced.

In the past, fluorescent dyes have been used as external coolant leak detectors. Internal coolant leakage into the lubricant has been difficult to detect. Therefore, a trace element in the coolant is useful for detecting coolant leakage into the lub oil during routine oil anaylsis. The element should not normally be present in lube oil as additives nor as wear metals. It should not be toxic, expensive or detrimental to performance of the coolant.

Conventional supplemental coolant additives have typically provided ingredients for liner pitting protection, scale inhibition, buffering, defoaming and general corrosion protection. Sometimes ingredients for external leakage detection have also been provided. These supplemental coolant additives have been added to the coolant in the form of liquid, powder, pellets contained in a filter canister, etc.

The principal object of this invention is to provide novel supplemental coolant additive compositions to be used in the cooling systems for diesel engines to improve the performance and extend the operating life thereof plus reduce maintenance costs associated with diesel engine cooling systems.

It is a further object of this invention to provide compositions not only having the normal performance of conventional supplemental coolant additives, but also provide improved solder and aluminum protection plus better antifreeze compatibility.

It is a further object of this invention to provide compositions which offer two additional attributes not offered by conventional supplemental coolant additives, a surfactant/detergent to reduce fouling and a trace element to allow detection of coolant leakage into the lube oil.

This invention provides a heavy duty supplemental cooling additive composition containing a combination of components which coact to provide improved aluminum protection in hard water, improved lead solder protection and improved antifreeze compatibility. These improvements are achieved without sacrificing liner pitting protection and while minimizing silicate gelation and low temperature crystallization of disodium phosphate.

The novel heavy duty supplemental cooling additive of this invention comprises a buffer, a cavitation liner pitting inhibitor, a metal corrosion and hot surface corrosion inhibitor, a defoamer, a hot surface deposition and scale inhibitor and a detergent to reduce fouling problems. The buffer component is employed to maintain a substantially neutral pH in the cooling system as is known, but unlike prior art compositions does not contain sodium ions which have been found to contribute to the undesired formation of disodium phosphate ($Na_2HPO_4$) crystals at low temperature. The buffering agents employed in accordance with this invention are preferably potassium salts which do not promote crystal formation at low temperature.

Additionally the potassium serves as a trace element whereby leakage of the coolant into lubricating oil can readily be detected. The presence of potassium in the lubricating oil can be readily detected by known procedures.

Unlike prior art compositions, the heavy duty supplemental cooling composition of this invention also includes a surfactant or detergent which reduces fouling of heat transfer surfaces in the cooling system by lubricating oil or other organic contaminants.

This invention provides a composition adapted for use in heavy duty diesel engine cooling systems to achieve the foregoing objects. The composition of this invention is adapted for admixture with conventional antifreeze compositions used in automotive engine cooling systems. The composition comprises:

| Component | Approximate Weight Percentage |
|---|---|
| (1) A buffer component to maintain neutral pH. The buffer is a material which does not contain sodium and can include buffering agents (alone or in combination) potassium salts such as: potassium borates, phosphates, benzoates and the like. | 10 to 45 |
| (2) Cavitation liner pitting inhibitor. The cavitation inhibitor can include such components (alone or in combination) as: alkali metal salts (preferably potassium) of nitrites, molybdates and the like. | 5 to 20 |
| (3) Metal corrosion and hot surface corrosion inhibitor This includes materials (alone or in combination) such as: alkali metal salts (preferably potassium) of nitrates, silicates, dicarboxylates and azoles; calcium sulfonate, barium and sulfonate, dicarboxylic acid, sodium mercaptobenzothiazole and the like. | 15 to 50 |
| (4) Defoamer The defoamer includes components (alone or in combination) such as: silicone defoamers, alcohols such as polyethoxylated glycol, polypropoxylated glycol or acetylenic glycols | 0.5 to 2.5 |

| Component | Approximate Weight Percentage |
|---|---|
| and the like. | |
| (5) Hot surface deposition and scale inhibitor. This inhibitor includes components (alone or in combination) such as: phosphate esters, phosphino carboxylic acid, polyacrylates, styrene-maleic anhydride, sulfonates and the like. | 0.5 to 5 |
| (6) Detergent This component includes non-ionic and/or anionic components (alone or in combination) such as: phosphate ester surfactants, sodium alkyl sulfonates, sodium aryl sulfonates, sodium alkyl aryl sulfonates, linear alkyl benzene sulfonate, alkylphenols, ethoxylated alcohols, carboxylic esters and the like. | 0.5 to 5 |

A particularly preferred composition of the invention for use in heavy duty diesel engine cooling systems is as follows:

| Component | Approximate Weight Percentage |
|---|---|
| Dipotassium Phosphate | 36.215 |
| Sodium Molybdate Dihydrate | 8.607 |
| Potassium Nitrite | 9.074 |
| Potassium Silicate | 3.44 |
| Disodium Adipate | 6.148 |
| Mercaptobenzothiazole | 6.148 |
| Tolyltriazole | 3.689 |
| Potassium Nitrate | 19.880 |
| Polyethylene oxide | 0.060 |
| Calcium Sulfonate | 1.845 |
| Polyethoxylated alcohol | 1.845 |
| Sodium Xylene Sulfonate | 1.082 |
| Silicone Anitfoam | 0.369 |
| Copolymer of methacrylic acid and 2-acrylamido-2-methylpropane sulfonic acid | 0.615 |
| Dye | 0.246 |
| Fluorescent Dye | 0.123 |
| Polyacrylate Scale Inhibitor | 0.615 |
| | 100.000 |

The coolant additive compositions of this invention are added to conventional antifreeze cooling compoistions in an amount of from 2000 to 40,000 milligrams per liter, preferably 5000 to 10,000 milligrams per liter of coolant. The level of the additive composition should be naintained within the above range and supplemental additions thereof should be employed as needed.

The preferred coolant additive composition of the invention (PCA) was compared in a number of tests with a prior art coolant additive (PACA) having the following composition:

| | |
|---|---|
| 1. Sodium Metaborate ($NaBO_2.2H_2O$) | 32 ± 3.0% |
| 2. Sodium Tetraborate ($Na_2B_4O_7.5H_2O$) | 18 ± 3.0% |
| 3. Sodium Nitrate ($NaNO_3$) | 19 ± 2.0% |
| 4. Sodium Nitrite ($NaNO_2$) | 17 ± 2.0% |
| 5. Sodium Metasilicate ($Na_2 SiO_3$) | 8.0 ± 1.0% |
| 6. Mercaptobenzothiazole (M.B.T.) | 2.5 ± 0.5% |
| 7. Tolyltriazole (T.T) | 1.0 ± 0.2% |
| 8. Polyacrylate | 2.0 ± 1.0% |
| 9. Silicone Antifoam | 0.2 ± 0.05% |
| 10. Polyethylene oxide | 0.006 ± 0.002% |
| 11. Brilliant Bond Blue Powder | 0.20 ± .03% |

| ANTIFREEZE GELATION COMPATIBILITY* | | |
|---|---|---|
| | PACA | PCA |
| Prestone II Antifreeze | 146 | 84 |
| BASF 340-2 Antifreeze | 180 | 87 |
| Texaco JC-04 Antifreeze | 80 | 40 |

*This test is conducted by preparing a coolant solution containing 50% by volume of an antifreeze (3 commercial shown in table) and 50% by volume of water containing twice the recommended usage amounts of the additive compositions PCA (1.6 oz./gallon) and PACA (3.0 oz./gallon). The coolant is heated to 190° F. and held 24 hours and then filtered. The values reported in the Table represent the milligrams of filtrate.

| ANTIFREEZE LOW TEMPERATURE CRYSTALLIZATION COMPATIBILITY** | |
|---|---|
| PACA | PCA |
| 9.2 ml | 0.0 ml |

**This test is conducted by mixing 100 milliliters of 50% by volume BASF 340-2 antifreeze with water and then adding twice the recommended level of supplemental coolant additive. The mixture is cooled 24 hours to −35° F. and then warmed to −10° F. for 24 hours. The mixture is centrifuged at −10° F. and the volume of crystals determined and reported.

HIGH FLOW CIRCULATION TEST***

| | Copper | Silver Solder | Brass | Steel | Cast Iron | Cast Aluminum |
|---|---|---|---|---|---|---|
| PACA | 0.04 | 42 | 3 | 0.8 | 1.5 | 1.9 |
| PCA | 0 | 8 | 0 | 0.2 | 0 | 2.8 |

***This test is conducted by flowing ASTM Standard Corrosive Water containing identical amounts of PCA and PACA and a flow velocity of 8–10 feet per second over coupons composed of the materials shown in the table. The relative amount of corrosion for each coolant composition is shown in the table. The numbers in the above table represent the weight loss, in milligrams per week, of the metal coupons.

ASTM D-1384 GLASSWARE CORROSION TEST

| | Copper | Silver Solder | Brass | Steel | Cast Iron | Cast Aluminum |
|---|---|---|---|---|---|---|
| PACA | 2.5 | 67.2 | (0.5) | (0.4) | (0.4) | (0.6) |
| PCA | 5 | 0 | 2.6 | (0.1) | 0.9 | (0.9) |

The numbers in the above table represent the weight loss, in milligrams per week, of the metal coupons.

ASTM D-1384 GLASSWARE CORROSION TEST
(Modified to Use Hard Water)
MG. WT. LOSS/COUPON/WEEK
190° F., AIR, HARD WATER

| | Copper | Silver Solder | Brass | Steel | Cast Iron | Cast Aluminum |
|---|---|---|---|---|---|---|
| PACA | 2.5 | 19.8 | 1.1 | (0.1) | 0.5 | 295.2 |
| PCA | 4.8 | 1.5 | 2.9 | 0.9 | 3.1 | 6.3 |

The addition of detergent improves the performance of a supplemental coolant additive by preventing fouling. In a fouling test, used lube oil is added to coolant containing supplemental coolant additive. The stirred mixture is poured into the graduated cylinder and allowed to stand for a short period. The mixture is then poured out of the graduated cylinder. The less the amount of adhesion of the black used oil to the surface of the graduated cylinder, the better the anti-fouling performance of the supplemental coolant additive. The results of this fouling test are illustrated in the article: Hudgens, R. D. and Hercamp, R. D., "Test Methods for the Development of Supplemental Additive for Heavy-Duty Diesel Engine Coolants"; *Engine Coolant Testing: 2nd Symposium*, ASTM STP 887, Roy E. Beal, Editor, American Society for Testing and Material, Philadelphia, 1986 p 212 which is hereby incorporated by reference. The absence of adhesion of PCA is readily seen in FIG. 13 of this article illustrating PACA on the left and PCA on the right.

Those modifications and equivalents which fall within the spirit of the invention are to be considered a part thereof.

What is claimed is:

1. A heavy duty supplemental cooling additive composition for use in diesel engine coolants which performs the functions of buffering, liner pitting inhibition, metal corrosion and hot surface corrosion protection, defoaming and scale inhibition, said additive comprising:
   (a) a sodium-free buffer containing at least one compound selected from the group consisting of borate and phosphate salts,
   (b) a cavitation liner pitting inhibitor containing at least one compound selected from the group consisting of nitrite and molybdate salts,
   (c) a metal corrosion and hot surface corrosion inhibitor containing at least one compound selected from the group consisting of nitrates, silicates and azole compounds,
   (d) a defoamer containing at least one compound selected from the group consisting of silicone defoamers, alcohols and glycols, and
   (e) a hot surface deposition and scale inhibitor containing at least one compound selected from the group consisting of phosphonates, polyacrylates and sulfonate compounds.

2. A composition according to claim 1 wherein the buffer contains at least one compound selected from the group consisting of potassium borate and potassium phosphate salts to provide internal leak tracing.

3. A heavy duty supplemental cooling additive composition for use in diesel engine coolants which performs the functions of buffering, liner pitting inhibition, metal corrosion and hot surface corrosion protection, defoaming, scale inhibition and detergency, said additive comprising:
   (a) a sodium-free buffer containing at least one compound selected from the group consisting of borate and phosphate salts,
   (b) a cavitation liner pitting inhibitor containing at least one compound selected from the group consisting of nitrite and molybdate salts,
   (c) a metal corrosion and hot surface corrosion inhibitor containing at least one compound selected from the group consisting of nitrates, silicates and azole compounds,
   (d) a defoamer containing at least one compound selected from the group consisting of silicone defoamers, alcohols and glycols,
   (e) a hot surface deposition and scale inhibitor containing at least one compound selected from the group consisting of phosphonates, polyacrylates and sulfonate compounds, and
   (f) a detergent containing at least one compound selected from the group consisting of non-ionic and anionic surfactants.

4. A composition according to claim 3 wherein the detergent contains at least one compound selected from the group consisting of a sodium alkyl sulfonate, a sodium aryl sulfonate, a sodium alkyl aryl sulfonate and a linear alkyl benzene sulfonate.

5. A composition according to claim 3 wherein the buffer contains at least one compound selected from the group consisting of potassium borate and potassium phosphate salts to provide internal leak tracing.

6. A heavy duty supplemental cooling additive composition comprising:

| Component | Approximate Weight Percentage |
|---|---|
| Dipotassium Phosphate | 36.215 |
| Sodium Molybdate Dihydrate | 8.607 |
| Potassium Nitrite | 9.074 |
| Potassium Silicate | 3.44 |
| Disodium Adipate | 6.148 |
| Mercaptobenzothiazole | 6.148 |
| Tolyltriazole | 3.689 |
| Potassium Nitrate | 19.880 |
| Polyethylene oxide | 0.060 |
| Calcium Sulfonate | 1.845 |
| Polyethoxylated alcohol | 1.845 |
| Sodium Xylene Sulfonate | 1.082 |
| Silicone Antifoam | 0.369 |
| Copolymer of methacrylic acid and 2-acrylamido-2-methylpropane sulfonic acid | 0.615 |
| Dye | 0.246 |
| Fluorescent Dye | 0.123 |
| Polyacrylate Scale Inhibitor | 0.615 |

7. A method of maintaining the cooling efficiency of a diesel engine which comprises adding to the cooling system a composition according to claim 1 in an amount of from about 2,000 to 40,000 milligrams per liter of the diesel engine coolant.

8. A method of maintaining the cooling efficiency of a diesel engine which comprises adding to the cooling system a composition according to claim 2 in an amount of from about 2,000 to 40,000 milligrams per liter of the diesel engine coolant.

9. A method of maintaining the cooling efficiency of a diesel engine which comprises adding to the cooling system a composition according to claim 3 in an amount of from about 2,000 to 40,000 milligrams per liter of the diesel engine coolant.

10. A method of maintaining the cooling efficiency of a diesel engine which comprises adding to the cooling system a composition according to claim 5 in an amount of from about 2,000 to 40,000 milligrams per liter of the diesel engine coolant.

* * * * *